Figure 1:
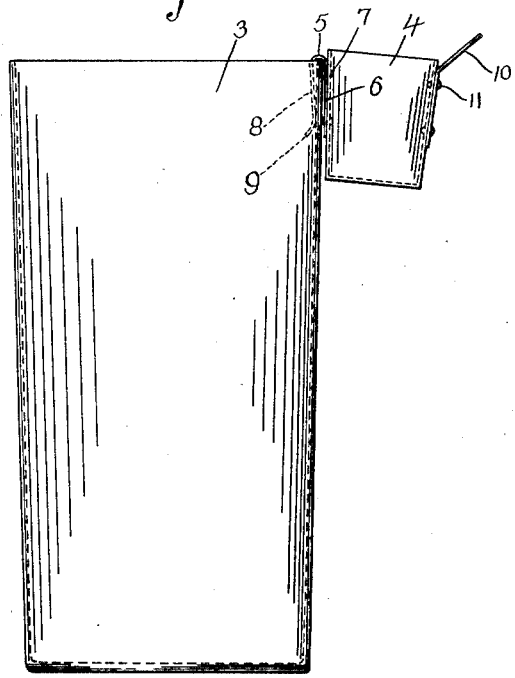

June 10, 1930.  H. M. GREIST  1,762,331
AUXILIARY CONTAINER
Filed Jan. 22, 1929

Inventor
Hubert M. Greist
By Rockwell & Bartholow
Attorneys

Patented June 10, 1930

1,762,331

UNITED STATES PATENT OFFICE

HUBERT M. GREIST, OF SCARSDALE, NEW YORK

AUXILIARY CONTAINER

Application filed January 22, 1929. Serial No. 334,220.

This invention relates to an auxiliary container and more especially to an auxiliary container which may be detachably supported on a receptacle.

It is customary to serve a slice of lemon with a glass of iced tea or similar beverages, which is usually squeezed between the fingers of the consumer in order to extract the juice of the lemon to flavor the tea. As is well known, it is hard to direct the juice of a slice of lemon into a receptacle, the juice usually spraying on the consumer and on surrounding objects. Herein it is proposed to serve the lemon used for flavoring purposes in the form of a liquid and to provide a receptacle in which the liquid may be contained, the receptacle to be supported on the glass containing the beverage in which the lemon juice is to be used. In this manner it is possible to regulate the flavoring of the beverage and to prevent the soiling of the fingers, etc.

An object of the invention is to provide means whereby an auxiliary receptacle for lemon juice or the like may be detachably supported on the upper edge of a glass.

A still further object of the invention is to provide a container for lemon juice or the like, provided with a handle to assist in attaching or detaching the container from a receptacle.

A feature of the invention resides in a novel form of handle for an auxiliary container on which a slice of lemon or the like may be supported if desired.

To these and other ends, the invention consists in the novel features and combination of parts to be hereinafter described and claimed.

In the drawings—

Figure 2:
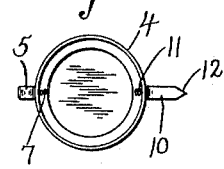

Fig. 1 shows a receptacle having an auxiliary container, according to my invention, supported on the upper edge thereof; and Fig. 2 is a plan view of the auxiliary container shown in Fig. 1.

Referring to the drawings in which I have illustrated my invention by showing a preferred form thereof, the reference numeral 3 indicates, in general, a glass or other receptacle in which iced tea or any other desired beverage may be served. Supported on the upper edge of receptacle 3 is an auxiliary container having a hollow body 4, a substantially U-shaped spring clip 5, having a leg 6 thereof secured to container 4, by suitable means, as for example, rivets 7, and another leg 8 adapted to be received on the interior of the glass 3, leg 8 extending inwardly at its lower end towards container 4 and then curving abruptly outwardly, as at 9, to provide for the ready entrance of the edge of the receptacle 3 between the legs of the clip.

On the opposite side of auxiliary container 4 from clip 5 is an outwardly and upwardly extending part 10 secured to container 4 by suitable means, as for example, rivets 11, part 10 extending outwardly from the upper edge of container 4, and being sharpened at its outer end 12 for a purpose to be hereinafter described.

In use, container 4 may be filled to any desired depth with the juice of a lemon or the like, and supported on the upper edge of a glass or other receptacle by means of the clip provided. When the iced tea or other beverage contained in the receptacle is served, the consumer may flavor the tea or other beverage by detaching the auxiliary container from the receptacle and pouring so much of the contents thereof as is desired into the beverage. The sharpened outer end 12 of the part 10 provides means whereby a slice of lemon or other fruit may be supported on the container if desired, and also part 10 may be readily grasped in attaching or detaching the container on a receptacle thus forming a handle.

While I have shown and described a preferred embodiment of my invention, it will be understood that it is not to be limited to all the details shown, but is capable of modification and variation within the spirit of the invention and the scope of the appended claims.

What I claim is:—

1. In an auxiliary container, a hollow body portion, means on the exterior of said body portion to detachably engage a receptacle, and a handle on the opposite side of said body portion from said engaging means, the end of said handle being relatively sharp.

2. In an auxiliary container, a hollow body portion in which a flavoring extract may be received, means for detachably engaging a receptacle to support the container thereon, and a handle on the opposite side of said body portion from said receptacle-engaging means, the end of said handle being relatively sharp.

3. In an auxiliary container, a hollow body portion in which a flavoring extract may be received, and an exterior spring element secured thereto adapted to detachably engage a receptacle, and a handle on the opposite side of said body portion from said receptacle-engaging means, the end of said handle being relatively sharp.

4. In an auxiliary container, a hollow body portion adapted to receive a flavoring extract and a substantially U-shaped receptacle-engaging member mounted on an exterior portion of the body of the container, and a handle on the opposite side of said body portion from said receptacle-engaging means, the end of said handle being relatively sharp.

5. In an auxiliary container, a hollow body portion adapted to receive a flavoring extract, and a substantially U-shaped spring element mounted on said body portion and adapted to engage a receptacle, said spring element having one leg thereof attached to the receptacle and the other leg provided with an outwardly bent lower end adapted to permit the ready reception of a receptacle between the legs of the element, and a handle on the opposite side of said body portion from said receptacle-engaging means, the end of said handle being relatively sharp.

6. In an auxiliary container, a hollow body portion, means on said body portion to detachably engage a receptacle, and means extending outwardly from said body portion upon which a slice of fruit may be received, said means being provided with a sharpened free end.

In witness whereof, I have hereunto set my hand this 10th day of October, 1928.

HUBERT M. GREIST.